Sept. 10, 1935.    H. E. WHITE ET AL    2,013,817
CIRCUITOUS ELEVATOR CONTROL SYSTEM
Filed May 23, 1931    4 Sheets-Sheet 2

Fig. 2.

WITNESSES:

INVENTORS.
Harold E. White &
Arthur W. Haverkamp.
BY
ATTORNEY

Sept. 10, 1935.  H. E. WHITE ET AL  2,013,817

CIRCUITOUS ELEVATOR CONTROL SYSTEM

Filed May 23, 1931  4 Sheets-Sheet 3

WITNESSES:
Arthur J. McMahon
A. A. Steinmiller

INVENTORS.
Harold E. White &
Arthur W. Haverkamp.
BY
ATTORNEY

Patented Sept. 10, 1935

2,013,817

UNITED STATES PATENT OFFICE 2,013,817

CIRCUITOUS ELEVATOR CONTROL SYSTEM

Harold E. White and Arthur W. Haverkamp, Wilkinsburg, Pa., assignors to Westinghouse Electric and Manufacturing Company, a corporation of Pennsylvania Application May 23, 1931, Serial No. 539,552

11 Claims. (Cl. 187—16)

Our invention relates to control systems for circuitous elevators and has particular relation to a key-operated call switch embodying means for indicating the relative positions of the elevator cars.

The term "circuitous elevator", as employed herein, designates a structure having a plurality of cars, cages or receptacles movable in a circuitous or endless path.

Circuitous elevators have been proposed as a solution to the problem of parking a large number of automobiles upon a comparatively small ground area, as well as for passenger service, to increase the transportation capacity of elevators and reduce the amount of floor space required in buildings for the elevators. Our present invention relates especially to control systems for circuitous elevators employed, particularly for the storage or parking of automobiles.

In the present invention we employ a control system whereby a door for providing access of automobiles to the cages of a circuitous elevator is normally closed and whereby it is automatically opened only after the movement of a selected cage to a position adjacent to the door and the stopping thereof in that position is effected. Further, we provide a single operating means for selectively calling any one of the cages to the loading and unloading station which automatically effects the opening of the door at the loading and unloading station upon the arrival and stopping of the selected cage thereat, whereby the necessity for operating two control devices in sequence is obviated. We employ key-operated mechanisms for operating the single control means, and the removal of the key from its associated operating mechanism automatically effects the reclosing of the door or doors. Therefore, the door, in our present invention, is open only during entrance or exit of an automobile into and from the building.

The commercial and operating advantage which we secure by requiring the operation of only a single device, instead of two, is apparent.

In all of the control systems for circuitous elevators, previously known or employed in the art, the door providing access to the cages, is opened or capable of being opened regardless of what cage is at the door. This is a disadvantage in that any unauthorized person has access to the automobile in the cage at the door.

Our present invention insures complete privacy for every cage of the elevator by allowing the door to be opened only when the cage corresponding to a particular key, for operating the control device comprising our invention, is employed. Thus, by preventing access to a cage by all persons except one having the proper key, a hitherto unattained degree of protection from theft or other molestation is achieved.

The structure of the single control means which we employ is such that it inherently gives an indication of the relative positions of the cages and also the positions of the cages relative to the loading and unloading station or any other predetermined station.

Our present invention also includes a control system by means of which, upon the operation of a single control means, a selected cage is automatically moved to a predetermined position, such as the loading or unloading station, by the shortest route and is automatically stopped thereat.

It is, therefore, an object of our invention to provide complete privacy for each cage of a circuitous elevator by preventing access thereto by unauthorized persons.

It is another object of our invention to employ a single control device for selecting any cage of a circuitous elevator, for automatically causing the cage so selected to move to a predetermined position and stop thereat, and for automatically opening a door upon the stopping of the selected cage at the predetermined position.

It is another object of our invention to provide a single combination cage-position indicator and control device for a circuitous elevator whereby any cage may be selected and the movement thereof controlled, and whereby an indication is given as to the positions of the cages relative to a predetermined station.

It is a further object of our invention to provide a control system, for a circuitous elevator, by means of which a door, for providing access of automobiles to the cages of a circuitous elevator is maintained normally closed, by means of which the door is automatically opened upon the completion of a call for a selected cage, and by means of which the door is automatically reclosed upon a restoration of a control device, comprising the control system, to an unoperated condition.

It is a still further object of our invention to maintain the movable indicating characters on a cage-position indicator of a circuitous elevator in a constant predetermined orientation for ease in reading them.

Other objects of our invention will be apparent from the following description, when read in connection with the accompanying drawings, wherein.

Figures 1, 6:
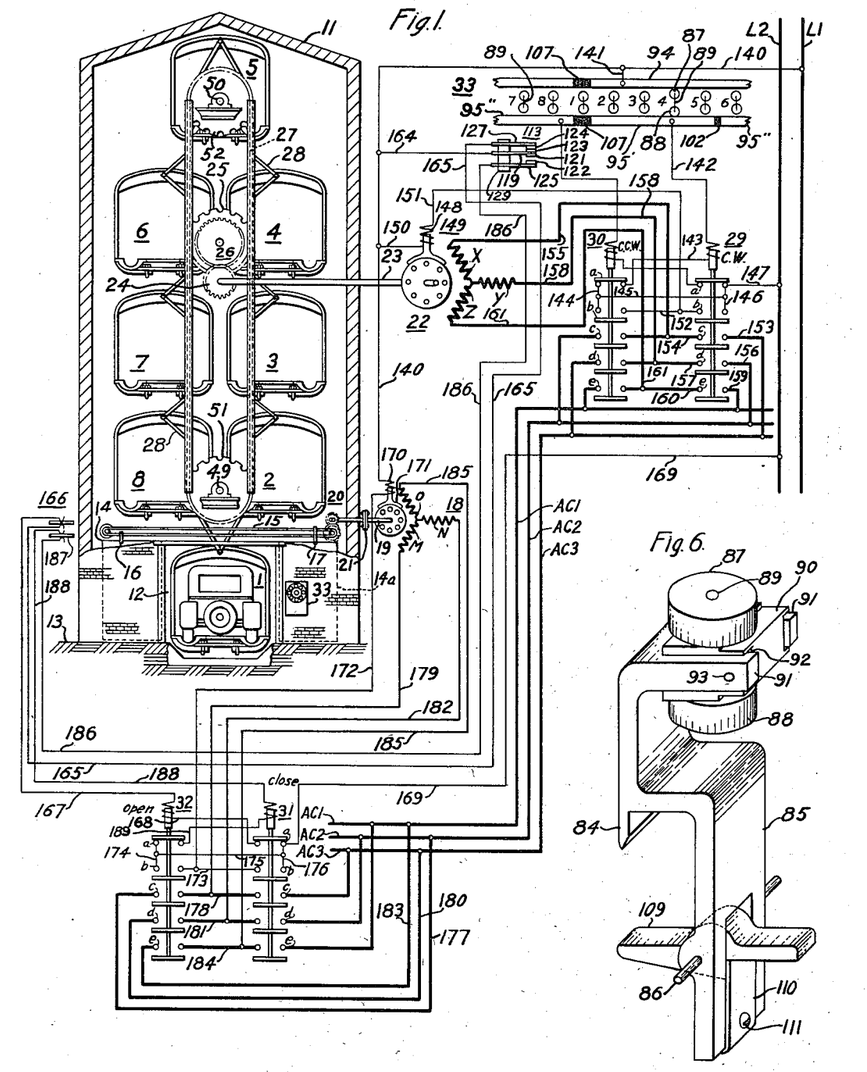
Figure 1 is a diagrammatic view, in front elevation of a circuitous elevator and a control system therefor, parts being broken away for clarity.
Fig. 6 is an enlarged view, in perspective, of one of the elements comprising our control device.

Referring to Fig. 1, we have illustrated a circuitous elevator comprising a suitably enclosed building structure 11, having eight elevator cages 1 to 8 movable successively through two adjacent vertical columns by transferring from the one to the other at the top and the bottom of the columns. The particular structure for supporting and moving the cages in a circuitous path is immaterial to our present invention and need not be described in detail, since circuitous elevators for applications of this type are well known in the art.

A doorway 12 is provided at the ground level 13 for effecting the entrance and exit of automobiles to and from any cage when it is stopped at the ground level. Although it is preferred to have the doorway 12 so disposed, for the reason that the loading and unloading of the cages is thereby most easily effected, the automobiles being capable of being driven under their own power directly through the open ends of the cages, the doorway 12 may be disposed in other positions in which the cages are capable of being loaded and unloaded. It should be understood that our invention is capable of being employed in structures in which the cages are not loaded and unloaded when in the lowermost position at the ground level.

A pair of sliding doors 14 and 14a are provided for opening and closing the doorway 12. Obviously, any other type of doors may be employed but, for purposes of illustration, we have shown the sliding doors and a mechanism for operating them, well known in the art, which comprises a horizontally disposed endless chain 15 supported, at its extremities above the doorway 12, by suitable sprocket wheels, shafts and bearings. The door 14 is connected to the lower run of the endless chain by a rigid connecting member 16, and the door 14a is connected to the upper run of the endless chain by a rigid connecting member 17. A suitable trackway, not shown, is provided for supporting the doors and allowing them to move with substantially no friction by means of pulleys which are suitably attached to the top edges of the door in engagement with the trackway.

Thus, upon movement of the endless chain 15 in one direction, the doors move outwardly from the center of the doorway 12 to open it, and, when the endless chain moves in the opposite direction, the doors move inwardly toward the center of the doorway to close it.

A motor 18, illustrated as of a three-phase induction type, although it may be of any other suitable type, is provided for the purpose of moving the endless chain 15 and, as a result, operating the doors 14 to open and close the doorway 12. A suitable mechanical connection between the shaft 19 of the motor 18 and the endless chain 15 is provided, such as a speed-reducing gear mechanism 20 and a clutch 21 which allows the motor to rotate, although the doors may be jammed, and which thus protects the windings of the motor and prevents them from burning out because of overload.

It should be understood that the particular mechanism for operating the doors 14 and 14a is immaterial to our present invention, which is concerned only with the automatic control of the door-operating motor 18.

A main driving motor 22 is provided for the purpose of moving all of the cages simultaneously. The particular method of driving the cages is immaterial to our present invention, but, for purposes of illustration, we have shown a shaft 23 of a motor 22, illustrated as of the three-phase induction type, although it may be of any other suitable type, having a pinion 24 keyed or splined thereto, which drives a sprocket wheel 25 through an intervening speed-reducing gear train 26, not shown in detail. The driving sprocket 25 has a diameter substantially equal to the distance between endless chains 27, from which the cages are pivotally suspended by means of the relatively movable bracket arms 28. Thus, it will be seen that rotation of the driving sprocket wheel 25 in one direction simultaneously moves the cages in one column downwardly and the cages in the adjacent column upwardly, the cages transferring at the top and the bottom at an increased speed by means of the bracket arms 28, whereby a continuous circuitous movement of the cages is effected although the cages are closely spaced during movement in the vertical columns.

We have provided a control system for controlling the operation of the elevator-motor 22 and the door-motor 18 which comprises a clockwise-direction relay 29 and a counter-clockwise-direction relay 30 for the motor 22, as well as a closing relay 31 and an opening relay 32 for the door-motor 18.

As an essential part of our present invention, a combination cage-position indicator and call-registering or control device 33, which is shown diagrammatically in Fig. 1 and in detail in Figs. 2, 3, 4 and 5, has been provided for the purpose of controlling the actuation of the relays 29, 30, 31 and 32, as well as for indicating to an observer the positions of the cages relative to each other and to a predetermined station, such as the doorway 12.

Figure 2:
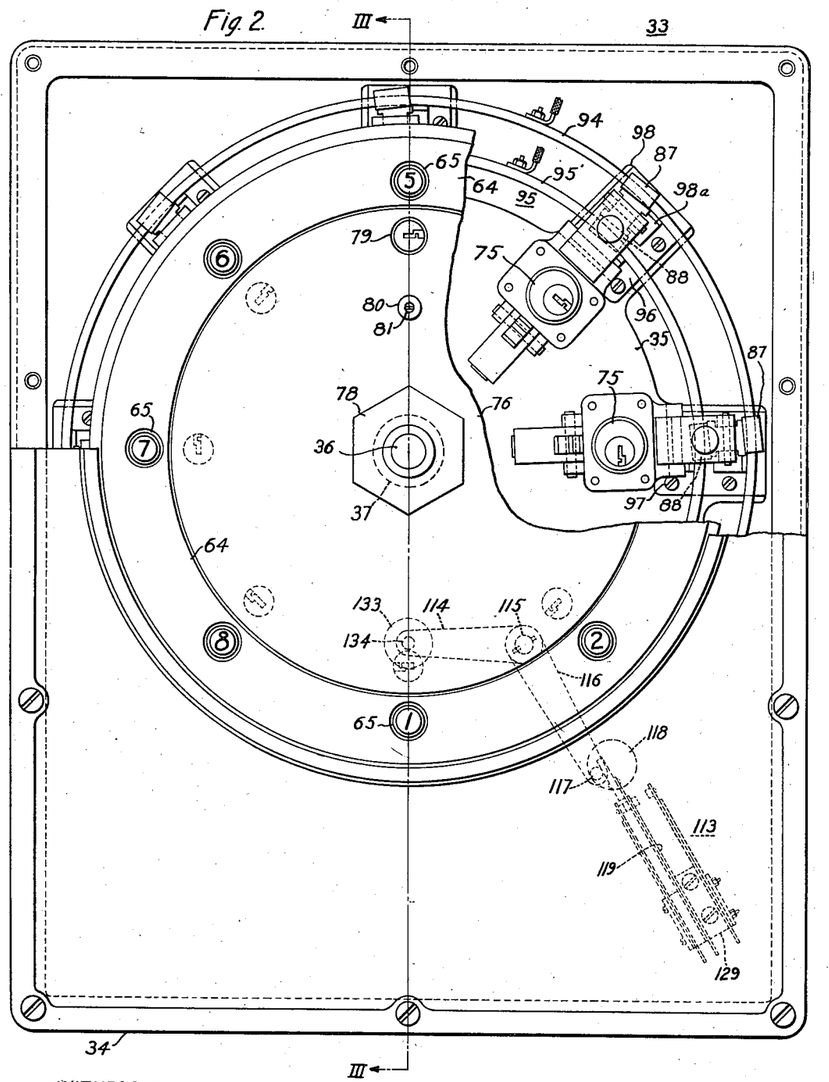
Fig. 2 is an enlarged view, in front elevation, of a specific embodiment of the combination control and cage-position indicating means comprising our invention.
Figures 3, 4:
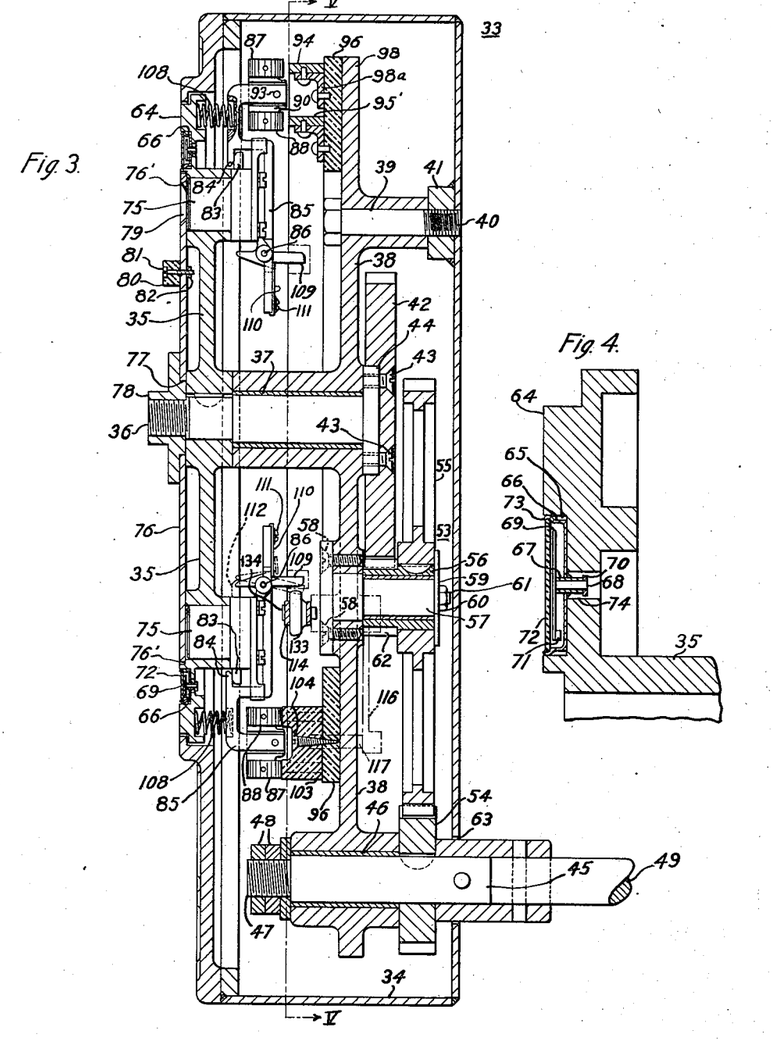
Fig. 3 is a view in section, taken on line III—III of Fig. 2.
Fig. 4 is an enlarged view, corresponding to a part of Fig. 3, wherein the structure for orienting the indicating characters in a constant predetermined position is shown in detail.
Figure 5:
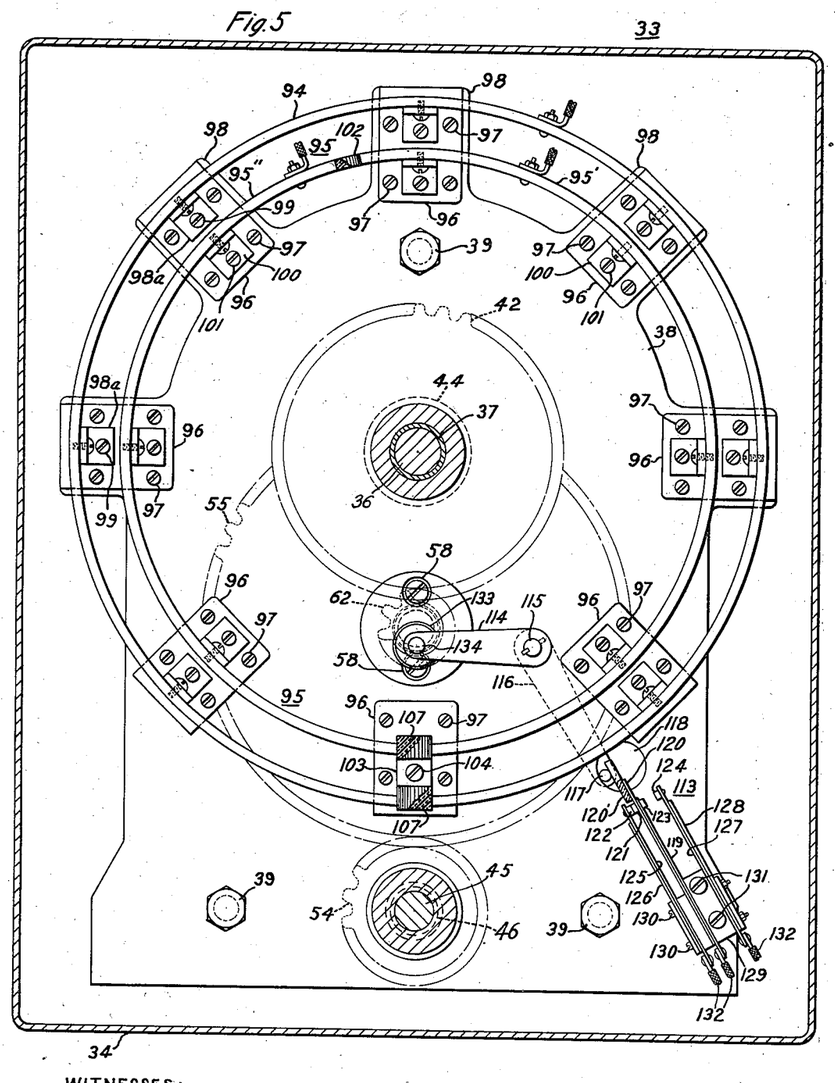
Fig. 5 is a view, taken on line V—V of Fig. 3, showing, in further detail, the internal structure of our control device.

Referring particularly to Figs. 2, 3 and 5, it will be seen that the indicator-control-device 33 includes a fabricated, box-like structure or supporting-base 34 for supporting, within itself, a rotatable wheel 35 which is keyed or splined to a centrally disposed shaft 36. The shaft 36 is supported in a suitable bearing member 37 which projects horizontally from a vertically disposed supporting plate 38, secured, in spaced relation, to the rear wall of the supporting base 34 by any suitable means, such as three triangularly spaced bolts 39. The bolts 39 have threaded portions 40 for engaging threaded holes in block members 41 which are welded or secured in any other suitable manner, to the rear wall of the supporting base 34.

A gear wheel 42 is rigidly secured to the end of the shaft 36, between the supporting member 38 and the rear wall of the supporting base 34, as by screws 43 which engage aligned threaded holes in the gear wheel 42, and in a flanged collar member 44, keyed to, or integral with, the shaft 36.

A shaft 45 is suitably supported parallel to, and in vertical alignment with, shaft 36, in a bearing member 46 secured at the bottom of the supporting member 38. The shaft 45 has a threaded portion 47 for permitting nuts 48 to be threaded thereon to retain the shaft in a definite longitudinal position in the bearing 46 but permitting it to rotate freely therein. The shaft 45 extends through a hole 63 in the rear wall of the supporting base 34 and is suitably connected to a shaft 49 or a shaft 50 (see Fig. 1) to which the lower and upper sprocket wheels 51 and 52 are respectively keyed, by means of any suitable gear-wheel mechanism (not shown) whereby the shaft 45 rotates in accordance with the rotation of the sprocket wheels 51 and 52. It will thus be seen that the shaft 45 rotates in accordance with the movement of the cages of the circuitous elevator.

The wheel 35 is rotated in accordance with the movement of the cages by means of an intervening gear-train 53, which provides the proper ratio of movement between a pinion gear 54, keyed to the shaft 45 within the supporting base 34, and the gear wheel 42 secured to the shaft 36, as previously described.

The gear-train 53 comprises a gear wheel 55, keyed or splined to a cylindrical hub 56 which is rotatable on a horizontally disposed shaft or pin 57, rigidly secured in perpendicular relation to the supporting member 38 by means of the screws 58 which engage threaded aligned holes in the flanged end of the pin 57 and in the supporting member 38. A collar or washer 59 and a nut 60, for engaging the threaded end 61 of the pin 57, are provided for the purpose of maintaining a constant vertical plane of rotation of the gear wheel 55.

A pinion gear-wheel 62 is provided on the hub 56 for engaging the gear wheel 42. The pinion gear-wheel 62 may be either integral with the hub 56 or comprise an additional cylindrical member banded on the hub.

We employ the rotation of the wheel 35 to indicate to the observer the positions of the cages relative to the doorway 12. The wheel 35 is suitably formed or fabricated so that a peripheral flange surface is disposed in a vertical plane flush with the face or front wall of the supporting-base 34 to constitute a dial face 64.

A plurality of holes 65 are bored in the dial face 64, spaced at equal angular distances, each for the purpose of receiving a cup-member 66 (see Fig. 4) which is tightly fitted in a hole 65 in order to be maintained in a fixed position therein.

A cylindrical bushing 67, extending through a hole in the center of the bottom of each cup and suitably secured to the cup as by soldering, or press fitting, is provided for rotatably supporting a shaft or pin 68, which has a disc-member 69 keyed or press-fitted at the end thereof within the cup-member 66 and a collar 70 press-fitted on the external end thereof for maintaining a fixed longitudinal position of the pin 68 with respect to the bushing 67.

Numerals corresponding to the respective cages, are painted, stamped or otherwise suitably recorded on the front surfaces of the disc members 69.

A weight 71 is suitably attached at a point on the rear face and at the periphery of each of the disc members 69 for the purpose of constantly orienting the disc member 69 in such position that the numerals thereon are always in the upright or vertical position.

A disc 72 of glass, celluloid or other transparent material, is fitted into an annular biasing ridge 73, which extends around the open edge of the cup-member 66, in a position flush with the surface of the dial face 64 for the purpose of improving the appearance thereof and keeping dust particles out of the cup member 66.

A hole 74 is bored through the peripheral flange of the wheel 35, co-axially with respect to each of the holes 65, for the purpose of receiving the projecting end of the cylindrical bushing 67 and also for the purpose of constituting a simple means whereby the cup member 66 may be removed by being pushed outwardly from the inner side of the flange of the wheel 35.

It will thus be clear that we have provided a structure which comprises an integral replaceable indicating member and which may be readily installed and removed.

The numerals on the disc-members 69 are arranged in a sequence corresponding to the relative positions of the cages and, thus, by observing the position of the indicating numerals or characters with respect to the lowermost point in their circular path of movement, the position of any of the cages with respect to the doorway 12 may be readily observed.

The indicator-control device 33 is additionally provided with a plurality of locks 75, one for each cage of the circuitous elevator, and each operable only by a particular key, to register a call for the cage corresponding to the key employed. A master key, which will be in the possession of an attendant or owner, may be provided to permit a particular cage to be called if the key therefor in the possession of the tenant, is lost.

The locks 75, of a cylindrical type, are fitted into holes, bored through the peripheral flange of the wheel 35, and suitably secured thereto. The holes for the locks 75 are spaced at regular angular intervals, internally with respect to, and radially aligned with, the holes 65 which contain the indicating disc-members 69. Thus, a particular cage is selected by observing the numerals on the indicating discs 69 and then inserting the key, corresponding to the particular cage desired, in the lock 75, which is radially aligned with the indicating disc 69 corresponding to the particular cage desired.

For the purpose of permitting only one of the locks 75 to be operated at one time and for the purpose of improving the appearance of the dial face of the supporting-base 34, we provide a disc 76, of suitable material, having a centrally disposed hole therein, whereby the disc 76 may be rotatably mounted in a vertical position on a cylindrical shoulder 77 of a nut 78, screwed on the projecting threaded end of the shaft 36, in such position that the outer face of the disc 76 is flush with the surface of the dial face 64.

A shoulder 76' is provided on the inner periphery of the flange of the wheel 35 for allowing the periphery of the disc 76 to cooperate therewith and effect a close slidable relation between the disc and the flange.

A hole 79 extends horizontally through the disc 76 at a point in the face thereof near the periphery, so that the hole 79 may be positioned immediately in front of the lock 75, which it is desired to operate, by merely rotating the disc 76 to the proper position.

A knob 80 is suitably secured to the disc 76, preferably in radial alignment with the hole 79, for the purpose of allowing a person to grasp it and rotate the disc 76 to any position desired. Any suitable means may be provided for securing the knob 80 to the disc 76, but, for purposes of illustration, a bolt 81 extending through the knob and a suitable hole in the disc 76 and provided with a nut 82 is shown.

Each lock 75 is provided with a movable bolt 83 which normally projects out of the lock, radially, and engages a projecting shoulder or latch 84 on a lever 85. Each lever 85 is of substantially hook-shape and is pivotally secured to the wheel 35 by a pin 86 extending through the lever. A pair of rollers 87 and 88 are rotatably mounted at the opposite extremities of an electrically conducting pin 89 which extends radially, with respect to shaft 36, through an insulating block 90 rockably secured to each of the levers 85. The end of the hook portion of each of the levers 85 is bifurcated, and the spaced prongs 91 thereof engage grooves or slots 92 on opposite sides of the insulating block 90; the block being pivotally secured to the prongs by means of suitable pins 93. The grooves 92 are slightly wider than the prongs 91 to permit a limited rocking movement of the block and rollers about the pins 93.

Two annular members or rings 94 and 95 are disposed in spaced relation, preferably also in concentric relation, in a position for engaging but just out of engagement with the rollers 87 and 88, respectively, when the latch 84 of the lever 85 is engaged by the bolt 83 of the lock 75. The ring 94 is preferably, as illustrated, a discontinuous integral member of electrically conducting material and is suitably secured, co-axially with respect to the shaft 36, on a plurality of radially-spaced insulating blocks 96 secured to the supporting member 38, as by screws 97. For the purpose of reducing the weight of the control device 33, the supporting member 38 is so formed as to have a plurality of radially projecting fingers 98, to each of which one of the insulating blocks 96 is secured.

For the purpose of securing the ring 94 to the insulating blocks 96, a plurality of angle brackets 98a, and a plurality of screws 99 for securing the angle brackets 98a to the ring 94 and the insulating blocks 96, are provided.

The ring 95 is disposed internally and in spaced concentric relation with respect to the ring 94, the distance between the rings 94 and 95 corresponding to the distance between the rollers 87 and 88. Angle brackets 100 and screws 101 are employed for securing the ring 95 to the insulating blocks 96 in a manner similar to that for the ring 94. The ring 95 is composed of two semi-annular conducting segments 95' and 95'', the segment 95' being slightly longer than the segment 95''. An insulating block or segment 102 which completely separates and insulates the two juxtaposed ends of the segments 95' and 95'' near the top of the supporting-base 34, is suitably secured for effecting the continuity of the ring 95 between the two segments.

An insulating block 103 is provided for separating the two juxtaposed ends of the discontinuous ring 94 and of the segments 95' and 95'' diametrically opposite to the position of the segment 102. The block 103 is suitably secured, as by a screw 104, to the insulating block 96 disposed below, and in vertical alignment with, the shaft 36.

The block 103 is provided also with a pair of arcuate portions 107 which are spaced a distance corresponding to the distance between the rings 94 and 95. The portions 107 are so formed as to coincide with the surface of the rings 94 and 95 at their extremities and to extend, at the central portion thereof, to a height or distance, away from the contact surface of the rings, which is equal to the distance between the contact surface of the rings and the cooperating surface of the rollers 87 and 88 when the latter are maintained in their normal positions out of engagement with the rings.

A compression spring 108 is provided for each of the levers 85 to extend between suitable holes bored in the lever 85 and the adjacent internal face of the peripheral flange of the wheel 35, into which holes it is fitted and suitably secured. The springs 108 are provided for biasing the levers 85 toward a position in which the rollers 87 and 88 engage or make contact with the rings 94 and 95, respectively, when the bolt 83 of the corresponding lock 75 is retracted from engagement with the latch 84.

When the rollers 87 and 88 connect ring 94 and segment 95', a circuit for energizing the coil of the elevator-motor control relay 29 is completed, and the elevator is moved in a clockwise direction, the wheel 35 also simultaneously moving as previously described, in a corresponding direction. When the ring 94 and the segment 95'' are connected by the rollers, relay 30 is energized, and the elevator moves in a counter-clockwise direction, the wheel 35 also simultaneously moving in a corresponding direction.

The automatic stopping of the selected cage at the doorway 12 is effected when the rollers 87 and 88, on the lever 85, which are biased into engagement with the rings 94 and 95 by the retraction of bolt 83 of the lock 75 engage the portions 107 on the insulating block 103. The control circuits for the relays 29 and 30, maintained closed by the connection of ring 94 to either of the segments 95' and 95'', are opened when the rollers 87 and 88 engage the portions 107 and, therefore, the motor 22 is automatically stopped with the selected cage properly positioned at the doorway 12.

The end of the bolt 83, for each lock, is chamfered for cooperation with a similarly chamfered edge on the latch 84 of the corresponding lever 85, whereby the bolt 83 is capable of engaging the latch 84 and forcing the lever 85 back into its normal position against the force exerted by the spring 108. The purpose of this feature is to permit the withdrawal of the rollers 87 and 88 from engagement with the rings 94 and 95, at any time, by returning the key in the lock to its normal position in which the bolt 83 is projected to engage the latch 84. An emergency stop feature for the elevator is thus provided, because the engagement of the rollers 87 and 88 with the rings 94 and 95 constitutes, in effect, a switch which is included in the control circuits of the relays 29 and 30 for the elevator motor 22 and the disengagement of the rollers and the rings interrupts these circuits to cause the motor to stop the elevator.

The automatic opening of the doors 14 and 14a is effected upon the arrival of a selected cage at the doorway 12 by means including a reversing switch 113, which controls the door motor 18, and a pair of levers 114 and 116 operatively associated with, and movable to actuate, the switch 113 when the lever 85 of the selected lock is vertically oriented in a position corresponding to the position of the cage at the doorway 12.

Each of the levers 85 is provided with a short lever arm 109, which extends through a square hole 110 in a straight portion thereof and which is pivotally mounted on the pin 86 previously mentioned. A flat spring 110 is secured at one end thereof to the end of the lever 85, as by a screw 111, and the other end of the spring engages a shoulder, on the lever 109, which shoulder is aligned with the flat side of the lever 85. The lever 109 is thus normally held in perpendicular relation with respect to the straight portion of the lever 85 and also in parallel relation to the axis of the shaft 36.

The end of the lever 109, which projects toward the disc member 76, is so disposed as to be engaged and moved toward the shaft 36 by a bolt 112, projecting radially from the lock 75 when the key operates the lock to retract the bolt 83 and disengage it from the latch 84. Simultaneously, therefore, with the turning of the key in its lock 75, the rollers 87 and 88 engage the rings 94 and 95, respectively, and the end of the lever arm 109, opposite to the end engaged by the bolt 112, is moved radially outward from the axis of the shaft 36, and the lever arm 109 assumes a position at an angle to the axis of the shaft 36.

The lever 114 is disposed in front of the supporting member 38 and is provided with a roller 133 rotatably mounted on a pin 134 at one end of the lever 114 to be engaged and moved by the end of the lever arm 109 when the latter is in an angular position with respect to the shaft 36.

A horizontally disposed shaft 115 is provided, which extends perpendicularly through the supporting member 38 and is rotatably mounted therein by a suitable bearing member (not shown). The end of the lever 114, opposite to that on which the roller 133 is mounted, is keyed to the projecting end of the shaft 115, and one end of the lever 116, disposed on the rear side of the supporting member 38, is keyed to the end of the shaft 115 projecting on that side of the supporting member 38. A pin 117, secured to the end of the lever 116 opposite to the end keyed to the shaft 115, is provided for operatively engaging a movable contact arm 119 comprising the switching member of the switch 113. A hole 118 is provided in the supporting member 38 for permitting the pin 117 to extend therethrough and engage the movable contact arm 119, the hole being large enough to permit the movement of the pin to move the contact arm 119.

The switch 113 is of a construction similar to that of switches employed in telephone circuits and comprises a current-carrying contact arm 119, having contact members 121 and 123 at one end and on opposite sides thereof for engaging, respectively, at different times, the stationary contact members 122 and 124. The contact members 122 and 124 are mounted, respectively, at the ends of current-carrying contact arms 125 and 127 disposed on opposite sides of the contact arm 119. The ends of the contact arms 119, 125 and 127, opposite to that to which the contact members are attached, are rigidly secured in spaced relation to an insulating block 129 by means of suitable screws or bolts 130. Flat springs 120, 126 and 128 are provided for the contact arms 119, 125 and 127, respectively, and are secured at one end thereof, each in association with its contact arm for causing the contact arms to normally maintain predetermined positions in which the contact members 121 and 122 are engaged and the contact members 123 and 124 are disengaged.

The insulating block 129 is secured to the front side of the supporting member 38 in any suitable manner, for example, by screws or bolts 131, in such position that an insulating projection 120' of the spring 120 cooperates with the pin 117 on the lever 116.

Electrical conductors 132 are connected to the contact arms 119, 125 and 127 in any suitable manner.

The spring 120, associated with the contact arm 119 of the switch 113, is additionally employed to maintain the lever arms 114 and 116 in predetermined positions wherein the roller 133 is engageable by lever arm 109.

When the angularly disposed lever arm 109, on one of the levers 85, engages the roller 133, it causes it to move downwardly a short distance, which results in the movement of the lever arms 114 and 116 through an angle sufficient to cause the pin 117 to move the contact arm 119 against the force of spring 120 and thus cause contact members 121 and 122 of the switch 113 to be disengaged and the contact members 123 and 124 to engage.

The engagement of the contact members 123 and 124 closes a circuit, which will be hereinafter more fully described, for energizing the coil of the door-opening relay 32, whereby the motor 18 causes the doors 14 and 14a to open.

Whenever the contact members 121 and 122 re-engage, they close a circuit for energizing the coil of the door-closing relay 31, whereby the motor 18 causes the doors 14 and 14a to close.

It will thus be seen that, when a lever arm 85, corresponding to a selected cage, is vertically oriented in its lowermost position, at which time the cage corresponding thereto is at the ground level 13, the doors are automatically opened by actuation of the switch 113.

In the lowermost position of any lever arm 85, the rollers 87 and 88 thereof are engaged by the insulating portions 107 of the block 103 and biased, against the force exerted by spring 108, toward the front of the supporting base 34. As long as the bolt 112 of the lock 75 causes the lever arm 109 to maintain its angular position, the doors will remain open, but, when the key is turned back in the lock 75, or is removed, the doors are automatically and immediately closed.

The immediate effect of turning the key back to the inserting and removing position is that the bolt 112 is retracted to permit the lever arm 109 to reassume its position parallel to the axis of the shaft 36, under the force exerted by spring 110, and the bolt 83 is re-projected to engage the latch 84, whereby the rollers 87 and 88 are prevented from re-engaging the rings 94 and 95 when they are moved away from the portions 107 by subsequent rotation of the wheel 35.

When the lever arm 109 reassumes a position parallel to the axis of the shaft 36, it disengages the roller 133 and allows the levers 114 and 115 to be moved back to their normal positions, under the force exerted by the spring 120 of the contact arm 119 against the pin 117, which results in the disengagement of the contact members 123 and 124 and the reengagement of contact members 121 and 122 to effect the operation of the motor 18 to close the doors.

If the key is turned into an operative position in the lock 75 of the lever 85 having its rollers 87 and 88 in engagement with the hump members 107, the lever arm 109 is again moved into an angular position with respect to the axis of shaft 36 and thus moves the levers 114 and 116 into a position wherein the contact members 123 and 124 of the switch 113 are caused to reengage and effect the operation of the motor 18 to open the doors. Thus, if a desired cage is at the ground level 13, the operation of the corresponding lock 75 merely effects the operation of the motor 18 to open the doors. If the cage selected is in any other position than at the ground level 13, the movement of that cage to the ground level is first effected and, upon its arrival and stopping thereat, the doors are automatically opened.

The operation of our invention may be more clearly understood by a description of an assumed operation. Let it be assumed that a circuitous elevator is stopped in a position wherein the cages occupy positions as indicated in Fig. 1 and that a tenant desires to park his automobile in cage 4 of the elevator. The tenant rotates the disc 76, by means of the knob 80, until the hole 79 is immediately in front of the keyhole of the lock 75 corresponding to cage 4. He, thereupon inserts his key in the lock 75, radially aligned with the indicating numeral 4 on the dial face 64, and turns it.

The operation of the lock 75 causes the rollers 87 and 88 to engage, respectively, the ring 94 and the segment 95' of the ring 95, as shown in Figs. 1 and 2, and causes the lever arm 109 to assume an angular position with respect to the axis of the shaft 36, in the manner previously described.

The engagement of the rollers 87 and 88 with the ring 94 and segment 95' closes a circuit for energizing the coil of the clockwise-direction relay 29, whereby the relay is actuated to cause the motor 22 to drive the elevator in a clockwise direction. This circuit (see Fig. 1) for energizing the coil of relay 29 extends from supply conductor L1, through conductors 140 and 141, ring 94, roller 87, pin 89, roller 88, segment 95', conductor 142, coil of relay 29, conductor 143, normally closed contact members $a$ of counter-clockwise relay 30 and conductors 144, 145, 146 and 147, to supply conductor L2.

The energization of the coil of relay 29 effects the actuation thereof to open the normally closed contact members $a$ and close the normally open contact members $b$, $c$, $d$ and $e$ of the relay.

The contact members $a$ are in series-circuit relation to the coil of relay 30 and thus the opening of the contact members $a$ of relay 29 prevents the simultaneous energization of the relays 29 and 30, in a well known manner. The closing of contact members $b$ of relay 29 closes a circuit for energizing the coil 148 of a magnet-type brake 149, of well known construction, associated with the motor 22, and the brake is released to free the motor 22 for rotation, upon actuation of its three-phase windings X, Y and Z which is effected upon the closing of contact members $c$, $d$, and $e$ of relay 29.

The circuit for energizing the coil 148 of the brake 149 extends from supply conductor L1, through conductors 140 and 150, coil 148, conductors 151 and 152, contact members $b$ of relay 29 and conductors 146 and 147, to supply conductor L2.

The phase windings X, Y and Z are connected to the three-phase alternating-current supply conductors AC3, AC2 and AC1 by the closing of the contact members $c$, $d$ and $e$, respectively, of relay 29. The connection for phase X extends from supply conductor AC3 through conductor 153, contact members $c$ of relay 29, and conductors 154 and 155 to the outside terminal of phase X. The connection for phase Y extends from supply conductor AC2, through conductor 156, contact members $d$ of relay 29, and conductors 157 and 158, to the outside terminal of phase Y. The connection for phase Z extends from supply conductor AC1, through conductor 159, contact members $e$ of relay 29 and conductors 160 and 161, to the outside terminal of phase Z.

When the phase windings X, Y and Z are thus connected to the supply conductors AC3, AC2 and AC1, respectively, the motor 22 is actuated to rotate in a direction to cause the elevator to move in a clockwise direction, when viewed from doorway 12. It will thus be clear that the cage 4 has automatically started to move toward the doorway 12 in such direction that it will reach the doorway by the shortest route.

We have not shown any means for accelerating and decelerating the motor 22 to the normal speed of movement thereof. However, it should be understood that any well known means may be employed. We have omitted acceleration and deceleration means for the purpose of simplifying the control diagram.

Assuming then that the circuitous elevator has attained its normal speed of movement, the motor 22 continues to drive the elevator at this speed until the rollers 87 and 88 have traversed an arcuate path in accordance with the movement of the elevator, in a manner previously described, and engage the insulating portions 107. The circuit previously traced for energizing the coil of relay 29 is interrupted by the disengagement of the rollers 87 and 88 from the ring 94 and the segment 95'. The relay 29 is therefore, deenergized, the phase windings X, Y and Z disconnected from the supply conductors AC3, AC2 and AC1, and the coil 148 of the brake 149 deenergized to effect the setting of the brake by compression spring means (not shown). The motor 22 is thus stopped, and the brake 149 is set thereon so that the circuitous elevator is stopped in a position in which cage 4 is at the ground level 13.

Because the lever 85, associated with the lock 75 which was operated, assumes a vertical orientation at the time that the rollers 87 and 88 thereof are at the top point of the portions 107, one arm of the lever 109 engages the roller 133 and forces it downwardly a short distance, causing the levers 114 and 116 to move through an angle whereby contact members 123 and 124, of switch 113, engage in the manner previously described.

The engagement of the contact members 123 and 124 of the switch 113 closes a circuit for energizing the coil of door-opening relay 32, which results in the opening of the doors. This circuit extends from supply conductor L1, through conductors 140 and 164, contact arm 119, contact members 123 and 124, contact arm 127, conductor 165, limit switch 166 (which is of a well-known drum-type in which a segmented-contact drum moves in accordance with the movement of the doors, for opening the circuit when the doors have reached their completely opened extremity), conductor 167, coil of relay 32, conductor 168, normally closed contact members $a$ of door-closing relay 31 and conductor 169, to supply conductor L2.

Relay 32 is thus energized, the normally closed contact members $a$ thereof are opened and the normally opened contact members $b$, $c$, $d$ and $e$ thereof are closed. The contact members $a$ are in series with the coil of the door-closing relay 31 and thus the opening of the contact members $a$ prevents the simultaneous energization of the two relays 31 and 32, in a well-known manner.

The closing of the contact members $b$ of relay 32 closes a circuit for energizing coil 170 of a magnet-type brake 171, of well known construction, provided for the door motor 18, whereby the motor 18 is freed for rotation upon the actuation of its three-phase windings M, N and O by connection thereof to the three-phase alternating-current supply conductors AC1, AC3 and AC2 effected by the closing of the contact members c, d, and e, respectively, of the relay 32.

The circuit for energizing the coil 170 of the brake 171 extends from supply conductor L1 through conductor 140, coil 170, conductors 172 and 173, contact members b of relay 32 and conductors 174, 175, 176 and 169, to supply conductor L2.

The connection for phase M of motor 18 extends from supply conductor AC2, through conductor 177, contact members c of relay 32 and conductors 178 and 179, to the outside terminal of phase M.

The connection for phase N extends from supply conductor AC3, through conductor 180, contact members d of relay 32 and conductors 181 and 182, to the outside terminal of phase N.

The connection for phase O extends from supply conductor AC1, through conductor 183, contact members e of relay 32 and conductors 184 and 185, to the outside terminal of phase O.

The phase windings M, N, and O of the motor 18, being thus connected to the supply conductors AC2, AC3 and AC1, as just described, are energized to actuate the motor 18 to rotate in a direction to open the doors 12 by means of the door-opening mechanism previously described.

When the doors reach their completely-open positions, the circuit, previously traced, for energizing the coil of relay 32 and coil 170, is opened by opening of limit switch 166, which effects the stopping of the motor 18 to stop the doors and the deenergization of coil 170 to effect the setting of the brake 171.

The driver leaves his key in the lock 75 and drives his automobile upon the cage 4, after which he turns his key back to the proper position and removes it from the lock 75.

The turning back of the key causes the contact members 121 and 122 of the switch 113 to re-engage, in a manner previously described.

The engagement of the contact members 121 and 122 closes the circuit for energizing the coil of door-closing relay 31, which circuit extends from supply conductor L1, through conductors 140 and 164, contact arm 119, contact members 121 and 122, contact arm 125, conductor 186, limit switch 187 (which is similar to limit switch 166, and which is provided for opening the circuit when the doors are completely closed), conductor 188, coil of relay 31, conductor 189, contact members a of relay 32, and conductors 174, 175, 176 and 169, to supply conductor L2.

The actuation of relay 31, causes its normally closed contact members a to open and its normally open contact members b, c, d and e to close.

The contact members a of relay 31 are in series-circuit with the coil of relay 32 and thus the opening of the contact members a prevents the simultaneous actuation of relays 31 and 32.

The contact members b of relay 31 are parallel with the contact members b of relay 32 and thus the closing of the contact members b of relay 31 effects the energization of coil 170 of the brake 171 for the motor 18 to free the motor for rotation by means of substantially the circuit previously traced for the contact members b of relay 32 upon the connection of phase windings M, N and O, to the supply conductors AC3, AC2, and AC1 effected by contact members c, d and e, respectively, of relay 31.

The connections of the terminals of the phase windings M, N and O to the supply conductors AC3, AC2 and AC1 are established, respectively, by the closing of the contact members c, d and e of relay 31 through circuits which are sufficiently apparent from prior description to preclude the necessity for tracing them.

The connections of the terminals of phase windings M, N and O to the supply conductors AC3, AC2 and AC1, having been established, the motor 18 is actuated to rotate in a direction to close the doors 14 and 14a. When the doors are completely closed, the limit switch 187 operates to open the circuit, previously traced, for energizing the coil of relay 31, and the motor 18 is thus deenergized and the brake 171 reset thereon.

The elevator is now in a condition for subsequent operation by another person. Let it be assumed that a subsequent patron desires to call cage 1 when cage 4 of the circuitous elevator is at the ground level 13. It will be apparent from Fig. 1 that the rollers 87 and 88 associated with the lock 75, radially aligned with the numeral 1, will engage the ring 94 and the segment 95″, respectively. The segment 95″ is connected to the coil of counter-clockwise relay 30, and the operation of the circuitous elevator is, therefore, effected by means of relay 30 in a manner similar to that previously described for the relay 29. The connections are deemed sufficiently similar to those previously traced to obviate the necessity for a detailed tracing thereof. The stopping thereof at the ground level 13 and the operation of the door upon the arrival of cage 1 correspond to what has been previously described except that lever 109 on the lever 85 corresponding to cage 1 is employed.

Let it be assumed that, for some reason or other, a driver, after he has turned his key in the lock 75, changes his mind or desires to effect an immediate stopping of the circuitous elevator. This can be accomplished by turning his key back to the position in which it may be withdrawn. The fact that the end of the bolt 83 is chamfered and that the shoulder 84 on the lever 85 is chamfered in cooperative relation, permits the action of the bolt 83 to force the latch 84 toward the front of the supporting base 34 against the force exerted by the spring 108, and this disengages the rollers 87 and 88 from the ring 94 and the one or the other of the segments 95′ and 95″ with which they were in engagement.

Thus, the circuit for energizing the coils of either of the relays 29 and 30 is opened, and the immediate stopping of the elevator is effected.

It will be noted, therefore, that we have provided a control system for a circuitous elevator which embodies a combination cage-position indicator and selectively-operable control device whereby any one of a plurality of cages may be selected and caused to move to a predetermined position by the shortest route and stopped thereat automatically, and whereby a door providing access to and from a cage is automatically opened upon the stopping of the selected cage at a predetermined station.

It will also be seen that we have provided a single control means whereby the automatic operation of the circuitous elevator and a door providing access thereto is automatically effected, which control device represents a novel combination hitherto not known or employed in the art, including means, for indicating the position of the cages relative to a predetermined position, employing indicating numerals and means for mounting them which insures a constant upright orientation regardless of the angular position of the movable element upon which they are mounted.

It will be seen, further, that we have also provided means embodying a single control device by means of which the elevator may be immediately stopped at any time and which possesses a novel construction hitherto unknown and unemployed in the art.

In addition, it will be seen that we have provided a single control device which insures that a door providing access to the cages of the circuitous elevator shall be closed at all times except when an automobile is entering or leaving the building structure in which the elevator is disposed and which also insures complete privacy and protection for the tenant of any cage.

We have illustrated only one specific embodiment of our invention but it will be understood that it is capable of various modifications without departing from the spirit thereof and we desire, therefore, that no limitations shall be imposed upon our invention except such as are required by the prior art and by the scope of the appended claims.

We claim as our invention:

1. In a circuitous elevator, a plurality of receptacles movable in an endless path, means for selecting any one of said receptacles and causing it to be moved to a predetermined position by the shortest route, said means including control means having a member movable in accordance with the movement of said receptacles, a plurality of operating means on said movable member, one for each of said receptacles, for the purpose of selecting a desired receptacle, and means responsive to the actuation of any one of said operating means for selectively effecting the movement of said receptacles whereby the selected receptacle moves to the predetermined position by the shortest route.

2. In a circuitous elevator, a plurality of receptacles movable in an endless path, means for selecting any one of said receptacles and causing it to be moved to a predetermined position and stopped thereat, said means including control means, having a member movable in accordance with the movement of said receptacles, a plurality of operating means on said movable member, one for each of said receptacles for the purpose of selecting a desired receptacle, and means responsive to the actuation of said operating means for effecting the movement of the selected receptacle to the predetermined position and the stopping thereof upon its arrival at the predetermined position.

3. In a circuitous elevator, a plurality of receptacles movable in an endless path, means for selecting any one of said receptacles and causing it to be moved to a predetermined position and stopped thereat, said means comprising motive means for moving said receptacles, and control means therefor, including a member movable in accordance with the movement of said receptacles, a plurality of operating means on said movable member, one for each of said receptacles, for the purpose of selecting a desired receptacle, and means responsive to the actuation of any one of said operating means for selectively effecting the actuation of said motive means whereby the latter moves the receptacle, thus selected, to the predetermined position by the shortest route and for effecting the stopping of said motive means upon the arrival of the selected receptacle at the predetermined position.

4. In a circuitous elevator, a plurality of receptacles movable in an endless path, means for selecting any one of said receptacles and causing it to be moved to a predetermined position by the shortest route, said means comprising motive means for moving said receptacles, and control means therefor, including a member movable in accordance with the movement of said receptacles, a pair of stationary annular members disposed in insulated relation, one of said annular members being of discontinuous integral structure and the other having two arcuate conducting segments separated by two spaced insulating segments disposed in substantial diametric relation, a plurality of operating means on said movable member, one for each of said receptacles, for the purpose of selecting a desired receptacle and effecting the connection of one or the other of the segments of the said segmented annular member to the unbroken annular member in accordance with the position of the selected receptacle, and means responsive to the connection, thus established, for actuating said motive means to move the receptacles.

5. In a circuitous elevator, a plurality of cages movable in an endless path, a door normally closed during movement of said cages, motive means for moving said receptacles, motive means for operating said door, and means for controlling the operation of said cage-motive means and said door-motive means, said control means including means movable in accordance with the movement of said cages, and means thereon for selecting any one of said cages and stationary means associatively operable thereby for automatically effecting in sequence the operation of said cage-motive means to effect a movement of the selected cage to a predetermined position and stop it thereat, and the operation of said door-motive means to open said door.

6. In a circuitous elevator, a plurality of receptacles movable in an endless path, a door, normally closed during movement of said receptacles, means for selecting any one of said receptacles, causing it to be automatically moved to a predetermined position by the shortest route and stopped thereat, and causing said door to open when the selected receptacle stops, said means comprising motive means for moving said receptacles, and control means therefor, including a member movable in accordance with the movement of said receptacles, a pair of stationary annular members disposed in insulated relation, one being integral and having a discontinuous conducting surface and the other having two arcuate conducting segments separated by two spaced insulating segments disposed in substantial diametric relation, one of said insulating segments being flush with the surface of the conducting segments and the other extending away from the surface of conducting segments, a plurality of operating means normally out of engagement with said annular members, mounted on said movable member, one for each of said receptacles, for the purpose of selecting a desired receptacle and operable to a position for connecting either one of the conducting segments of the one of said annular members to the other annular member whereby said motive means is actuated to move said receptacles in a direction such that the receptacle selected moves to the predetermined position by the shortest route, and engageable with said raised insulating segment to be returned to the normal position thereof and to stop said motive means whereby the movement of the cage is stopped, and means responsive to the engagement of said operating means with said raised insulating segment for effecting the opening of said door.

7. In a circuitous elevator, a plurality of receptacles movable in an endless path, a door, normally closed during movement of said receptacles, means for selecting any one of said receptacles and causing it to be automatically moved to a predetermined position by the shortest route and stopped thereat and causing said door to open when the selected receptacle stops, said means comprising motive means for moving said receptacles, and control means therefor, including a member movable in accordance with the movement of said receptacles, a pair of stationary annular members disposed in insulated relation, one being integral and having a discontinuous, conducting surface and the other having two arcuate conducting segments separated by two spaced insulating segments disposed in substantial diametric relation, one of said insulating segments being flush with the surface of the conducting segments and the other extending away from the surface of the conducting segments, a plurality of operating means, which are normally out of engagement with said annular members, mounted on said movable member, one for each of said receptacles, for the purpose of selecting a desired receptacle and operable to a position for connecting either one of the conducting segments of the one of said annular members to the other annular member whereby said motive means is actuated to move said receptacles in a direction such that the receptacle selected moves to the predetermined position by the shortest route, and engageable with said raised insulating segment to be returned to the normal position thereof and to stop said motive means whereby the movement of the cage is stopped, and means responsive to the engagement of said operating means with said raised insulating segment for effecting the opening of said door, and responsive to the return of the operating means, engaging the insulating segment, to its unoperated condition for closing said door.

8. In a control device for a circuitous elevator having a plurality of cages movable in an endless path, means movable in accordance with the movement of said cages, a plurality of operating means on said movable means, one for each of said cages, for selecting a cage and registering a call therefor, means responsive to the operation of said operating means for effecting movement of said cages, and a member movably mounted on said movable means, for adjustment with respect thereto, to permit the operation of only one of said operating means at one time.

9. In a control system for a circuitous elevator, having a plurality of cages movable in an endless path, a control device, for selecting any cage and causing it to be moved to a predetermined position by the shortest route, including two stationary annular members, one thereof being of discontinuous, integral and conducting character, and the other having two substantially semi-circular conducting segments separated by comparatively short insulating segments, means movable in accordance with the movement of said cages, operating means thereon for selecting any cage and registering a call therefor, said operating means including means for connecting said unbroken annular member and one or the other of the segments of said segmented annular member in accordance with the position of the cage selected with respect to the said predetermined position, and means for effecting movement of the cages, responsive to the connection established between the annular members, whereby the selected cage moves to the predetermined station by the shortest route.

10. In a control system for a circuitous elevator having a plurality of cages movable in an endless path, a control device, for selecting any cage and causing it to be moved to a predetermined position by the shortest route, including two stationary annular members, one thereof being of discontinuous, integral, and conducting character, and the other having two substantially semi-circular conducting segments separated by comparatively short insulating segments, means movable in accordance with the movement of said cages, and a plurality of operating means thereon, one for each of said cages, for selecting any one of said cages and registering a call therefor, said operating means being disposed in a circle in a sequence corresponding to that of said cages, each of said operating means including means for connecting said integral annular member and one or the other of said segments comprising the said segmented annular member, depending upon the position of the cage, corresponding to the operating means, with respect to the said predetermined position, when the operating means is operated to register a call, and means responsive to the connection of the integral annular member with one or the other segments of the segmented annular member for automatically causing the selected cage to move to the predetermined position by the shortest route.

11. In a control system for a circuitous elevator having a plurality of cages movable in an endless path, a door for providing access to each cage when stopped in a predetermined position, means movable in accordance with the movement of said cages, means on said movable means for selecting any particular cage and registering a call therefor, said selecting means including an operating member movable from an unoperated to an operated position in response to the operation of said selecting means, and control means, responsive to the attainment of a predetermined orientation by said operating member when in an operated condition, for effecting the opening of said door.

HAROLD E. WHITE.
ARTHUR W. HAVERKAMP.